United States Patent [19]

Toshimitsu

[11] 4,245,268
[45] Jan. 13, 1981

[54] MAGNETIC HEAD WITH MEANS FOR ELIMINATING NOISE

[75] Inventor: Naohiko Toshimitsu, Chichibu, Japan

[73] Assignees: Canon Kabushiki Kaisha; Canon Denshi Kabushiki Kaisha, both of Tokyo, Japan

[21] Appl. No.: 29,464

[22] Filed: Apr. 12, 1979

Related U.S. Application Data

[63] Continuation of Ser. No. 845,434, Oct. 25, 1977, abandoned, which is a continuation of Ser. No. 663,115, Mar. 2, 1976, abandoned.

[30] Foreign Application Priority Data

Mar. 10, 1975 [JP] Japan .................................. 50-29338

[51] Int. Cl.$^3$ ............................................... G11B 5/12
[52] U.S. Cl. .................................... 360/124; 360/125; 360/123
[58] Field of Search .............................. 360/125–127, 360/128, 129, 123–124

[56] References Cited

U.S. PATENT DOCUMENTS

| Re. 23311 | 12/1950 | Camras | 360/124 |
| 3,048,666 | 8/1962 | Neville | 360/123 X |
| 3,334,192 | 8/1967 | Camras | 360/123 |

*Primary Examiner*—John H. Wolff
*Attorney, Agent, or Firm*—Fitzpatrick, Cella, Harper & Scinto

[57] ABSTRACT

A magnetic head comprises a magnetic head core having an output winding coiled thereon, a shield case for enclosing therein the magnetic head core, and a compensating coil for removing noise voltage produced in the output winding by external magnetic fluxes passing through the output winding.

6 Claims, 33 Drawing Figures

FIG. 4c
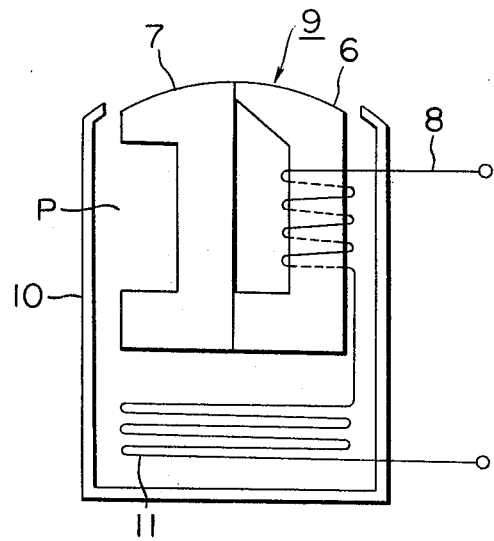
FIG. 5a
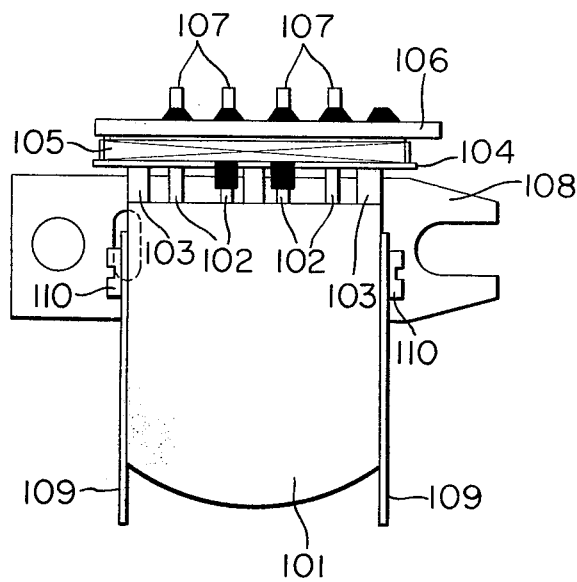
FIG. 5b
FIG. 5c
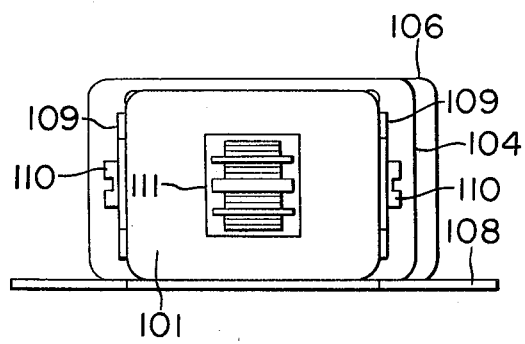
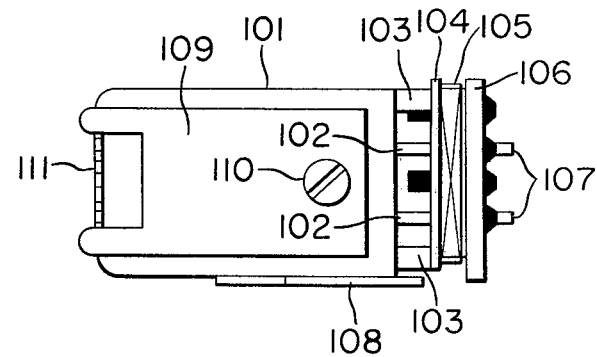
FIG. 6
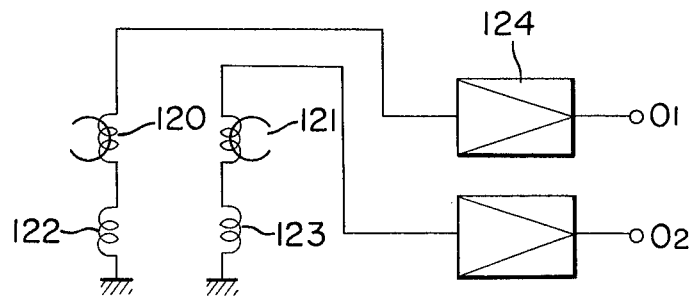

$Exyo = Exo + Eyo$
$= Exy1 + Exy2$
$= Ex1 + Ex2 + Ey1 + Ey2$

MAGNETIC HEAD WITH MEANS FOR ELIMINATING NOISE

This is a continuation of application Ser. No. 845,434 filed Oct. 25, 1977, now abandoned, which in turn is a continuation of Ser. No. 663,115, filed Mar. 2, 1976, now abandoned

BACKGROUND OF THE INVENTION

1. Field of the Invention

This invention relates to a magnetic head, and more particularly to a magnetic head having a novel construction which is capable of removing any noise produced by external magnetic field during recording or play-back.

2. Description of the Prior Art

Generally, in a magnetic head, magnetic fluxes are produced from a tape driving motor for slidably moving a tape along the sliding surface of the magnetic head during play-back of the tape and from the earth magnetism and other external equipments, and such magnetic fluxes pass through the reproduce core of the magnetic head to produce induced voltages in the reproduce winding coiled on the reproduce core, which induced voltages may provide noises which may in turn be mixed with the normal output information from the magnetic tape or similar recording medium, thus failing to provide correct reproduction of the recorded information.

For this reason, the magnetic head usually has its core accommodated within a shield case to isolate and protect the core from external magnetic fluxes. Structurally, however, the magnetic head must have its core gap portion brought into direct contact with the recording medium in order to pick up the information from the recording medium sufficiently well and therefore, the sliding surface of the core is exposed out of the shield case. Thus, the sliding surface of the core has been the greatest weak point in shielding the magnetic head.

What countermeasures have heretofore been adopted as the means for eliminating the above-noted drawbacks will now be described by reference to FIGS. 1 to 3 of the accompanying drawings. FIGS. 1(a) and (b) are perspective views of the two-track magnetic head cores according to the prior art; FIG. 2(a) illustrates the relationship between the external magnetic field and the reproduce coil in the magnetic head core of FIG. 1(a) as enclosed in a shield case; FIG. 2(b) is a graph of characteristic curve showing the magnitude of the induced noise voltage, produced in the magnetic head of FIG. 2(a), with respect to the directions of the external magnetic field; FIG. 3(a) illustrates the relationship between the external magnetic head and the reproduce coil of the two-track magnetic head core of FIG. 1(b) as enclosed in a shield case; and FIG. 3(b) is a graph of characteristic curve showing the magnitude of the induced noise voltage, produced in the magnetic head of FIG. 3(a), with respect to the directions of the external magnetic field.

The magnetic head shown in FIG. 1(a) is known as the balance-coiled magnetic head which includes cores 1 each comprising a pair of bilaterally symmetrical left and right core halves 1-1 and 1-2 abutting with each other, and winding 2 wound on the left and right core halves 1-1, 1-2 in the same direction and connected in series with each other. Reference will now be had to FIG. 2(a) to describe the relationship of an external magnetic field and the noise resulting therefrom when such cores 1 are enclosed in a surrounding shield case. The external magnetic flux entering the core 1 in the horizontal direction with respect to the tape sliding surface thereof and passing outwardly therethrough as indicated by chain line 4 is herein called Hx, and the external magnetic flux entering the core 1 in the vertical direction with respect to the tape sliding surface thereof and passing downwardly therethrough as indicated by solid lines 5 is herein called Hy. On the left and right core halves 1-1 and 1-2, coils 2-1 and 2-2 formed by a winding 2 are connected in series with each other and wound so as to produce electromotive forces of the opposite senses for magnetic fluxes of the same direction, so that the external magnetic flux Hy vertically entering the core 1 as indicated by solid lines 5 passes through the left and right core halves 1-1, 1-2 to produce the electromotive forces therein, but such electromotive forces produced in these core halves are offset due to the coils being formed on these core halves by the same winding and in the same direction of turn, thus producing no noise output. The external magnetic flux Hx horizontally entering the core as indicated by the chain line 4 passes through the two coils on the left and right core halves as shown, whereas the electromotive forces produced thereby are not offset but provide noise voltages. Usually, however, the shield case formed of a highly permeable material causes considerable part of the horizontal external flux to bypass, so that the amount of the horizontal magnetic flux Hx which passes through the coils is smaller than in the direction Hy and accordingly, the magnetic flux Hx usually contributes to production of noise voltages at a much lower rate than the vertical magnetic flux Hy. Therefore, from the viewpoint to removing the noise created in the output coil, elimination of the noise voltages resulting from the vertical magnetic flux would be externally effective and thus, the magnetic head of FIG. 2(a) is also highly useful to prevent production of noise voltages. In FIG. 2(b) which shows the characteristic curve of the induced noise voltage in the above-described magnetic head with respect to the directions of the external magnetic flux, the length of the segment from the origin 0 to any point on the curve represents the magnitude of the induced noise voltage in the direction of that magnetic flux. It will thus be seen that the noise voltage produced by the external magnetic flux of y-direction (vertical direction) is the smallest.

However, the magnetic head as shown in FIG. 1(a) is useful in preventing the production of noise, whereas it encounters the following drawbacks when it is desired to construct a multichannel head. Nowadays, from the needs for smaller size and yet improved recording density of magnetic heads, it is often attempted that adjacent ones of the cores forming multiple channels be spaced apart as closely as possible, whereas in the construction as shown in FIG. 1(a), such attempts are restricted by the adjacent coils and this forms a great barrier in making the heads smaller. As a method of mounting coils in the multichannel magnetic head with the spacing between adjacent channels reduced as much as possible, it has heretofore been practised, as shown in FIG. 1(b), to wind a coil 8 only on one of the core halves, 6, forming each channel head and to employ, as its partner core half, a core such as core 7 formed with a cutaway portion P which prevents the coil and adjacent core from contacting each other between adjacent channel cores and which receives therein the coiled portion of an adjacent core. This method is useful in that a number of cores can be accommodated within a limited space, but as already mentioned, it is much inferior in prevention of the induced noise to the magnetic head constructed as shown in FIG. 1(a). Reference will now be had to FIG. 3(a) to consider the influence of the induced noise voltages on the vertical magnetic flux Hy and the horizontal magnetic flux Hx when the magnetic head core 9 comprising the core halves 6 and 7 as shown in FIG. 1(b) is accommodated with a shield case 10. As shown in FIG. 3(a), an output coil 8 is wound only on one of a pair of core halves, so that the external magnetic flux Hy vertically entering the core (indicated by solid lines 5 as in FIG. 1(a) produces an induced voltage in the coil 8 and such induced voltage appears as a noise at the output while a noise is also produced by the horizontal external magnetic flux Hx (indicated by chain line 4 as in FIG. 2(a)).

Thus, neither of the magnetic heads shown in FIGS. 1(a) and (b) has satisfied the two desires, i.e. prevention of externally induced noise and realization of smaller head size but both of them have had their own merits and demerits.

SUMMARY OF THE INVENTION

In view of this, the present invention intends to provide a magnetic head which satisfies the above-described two desires. More particularly, the present invention is directed to a magnetic head which overcomes the problem resulting from external magnetic fluxes by adding a simple compensating coil to the magnetic head of FIG. 1(b) having many structural advantages.

Generally, the magnetic head according to the present invention comprises a magnetic head core having an output winding wound thereon, a shield case for enclosing therein the magnetic head core, and compensating means for removing noise voltage produced in the output winding by external magnetic fluxes passing through the output winding. The compensating means may be disposed in spaced apart relationship with the magnetic head core. Alternatively, the compensating means may be provided on the magnetic head core. The compensating means may comprise a coil connected to one end of the output winding so that it captures the external magnetic field passing through the output winding and that the induced voltage resulting from the capture negates the noise voltage produced in the output winding. The magnetic head core may comprise a core half for winding thereon the output winding, and a core half abutting with the first-named core half to form a magnetic gap therebetween and formed with a recessed portion for incorporating therein the coiled portion of an adjacent channel in noncontact relationship with the coiled portion of the adjacent channel.

The above objects and other features of the present invention will become more fully apparent from the following detailed description of various embodiments of the invention taken in conjunction with the accompanying drawings.

BRIEF DESCRIPTION OF THE DRAWINGS

FIG. 4(c) illustrates a modification of the magnetic head shown in FIG. 4(a).

FIGS. 5(a), (b) and (c) are a top plan view, a front view and a side view, respectively, of a specific embodiment of the magnetic head according to the present invention.

FIGS. 6, 7 and 8 are circuit diagrams showing the methods of the connection between a compensating coil forming an essential part of the present invention and the coil wound on the magnetic head core.

DESCRIPTION OF THE PREFERRED EMBODIMENTS

Figure 3A:
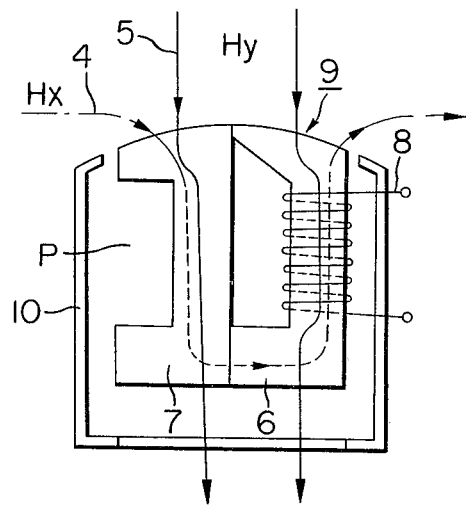
FIG. 3(a) illustrates the relationship between the external magnetic field and the reproduce coil when the magnetic head core of FIG. 1(b) is enclosed in a shield case.
Figure 3B:
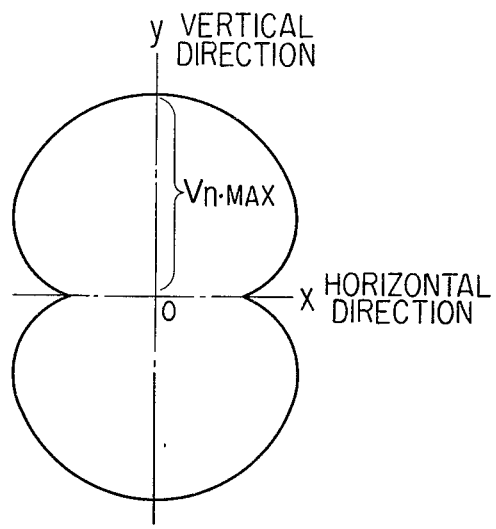
FIG. 3(b) is a graph of a characteristic curve showing the magnitude of the induced noise voltage in the magnetic head of FIG. 2(b) with respect to the directions of the external magnetic field.
Figure 4A:
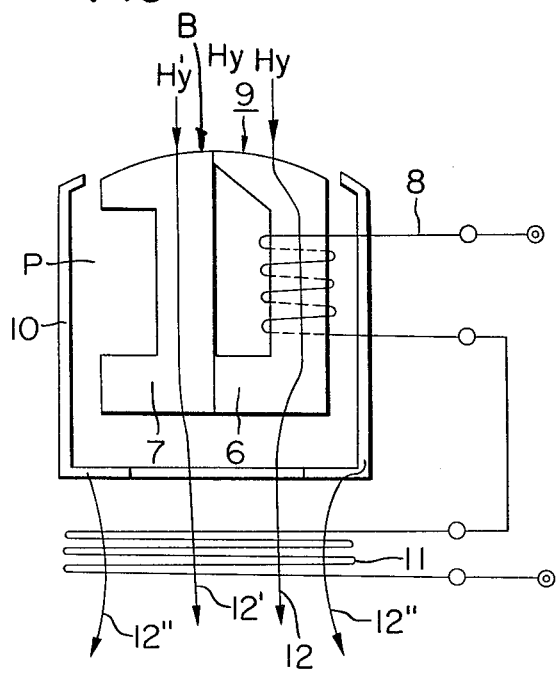
FIG. 4(a) illustrates the relationship between the external magnetic field and the reproduce coil in the magnetic head of the present invention.
Figure 4B:
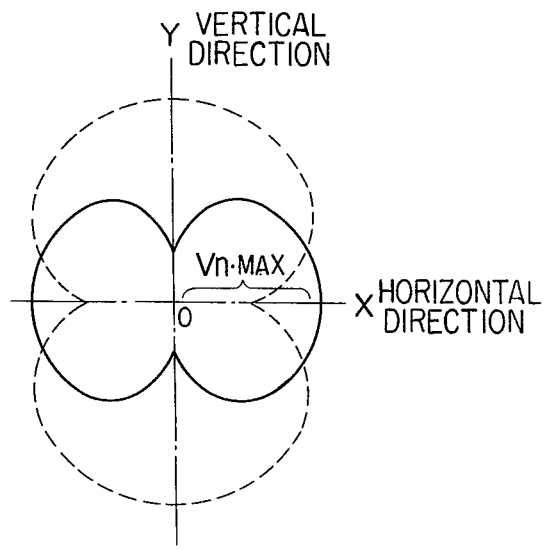
FIG. 4(b) is a graph of a characteristic curve showing the magnitude of the induced noise voltage in the magnetic head of FIG. 4(a) with respect to the directions of the external magnetic field.

Referring to FIG. 4(a) which illustrates the principle of the present invention, the construction of the magnetic head according to the present invention is such that a compensating coil 11 for capturing the magnetic flux passing outwardly through the shield case 10 of the magnetic head shown in FIG. 3(a) is formed outside the shield case 10 and at a location opposite from the sliding surface B of the magnetic head core 9 which is slidably contacted by a recording medium, the compensating coil 11 being connected in series with one end of the output coil 8 and arranged so as to be opposite in phase with the magnetic flux of the same direction. Because of such construction of the present invention, the problem of the magnetic field Hy vertical to the sliding surface of the magnetic head, which has been the greatest problem in the conventional head constructed as shown in FIG. 1(b), may be solved in that the magnetic flux 12 caused by the field Hy to pass outwardly through the right core half 6 forming the magnetic head core 9 and in the counter direction with respect to the sliding surface of the magnetic head can be captured and made opposite in phase by the compensating coil 11, thereby offsetting the power of noise induced by the coil 8 accommodated within the shield case 10. Also, according to the present invention, the presence of the compensating coil 11 situated outside the shield case 10 produces a much greater amount of magnetic flux than the magnetic flux 12 passing through the coil 8, namely, various magnetic fluxes such as not only the magnetic flux 12 but also a magnetic flux 12' passing through the other core half 7, a magnetic flux 12" passing outwardly through the shield case 10 and a magnetic flux passing through other channel core, and accordingly the induced voltage by the compensating coil 11 is much greater than the induced voltage by the coil 8 accommodated within the shield case. Therefore, the number of turns of the compensating coil 11 for offsetting the voltage of induced noise produced in the coil 8 may be much smaller than the number of turns of the coil 8 within the shield case, and particularly, by selecting the size and location of the compensating coil 11 so as to be capable of capturing such a great amount of noise flux, it will become possible to offset the voltage of induced noise in the coil 8 by a simple coil having a much smaller number of turns than that of the coil 8, say, 1/100 or less. This will be highly effective in practical use. FIG. 4(b) illustrates the outward direction of the magnetic field v.s. the noise characteristics in the magnetic head according to the present invention. In this figure, the solid line indicates the noise characteristics of the present invention, and the broken line indicates the noise characteristics of the conventional head (FIG. 3(a)).

In FIG. 4(a), the compensating coil 11 is shown as being situated outside the shield case 10, but the effect of the present invention may likewise be obtained even if the compensating coil 11 is provided inside the shield case as shown in FIG. 4(c).

FIG. 5 shows a specific embodiment of the present invention as applied to the conventional four-channel head for cassette auto-reverse. FIGS. 5(a), (b) and (c) are a top plan view, a front view and a side view, respectively, of the magnetic head according to the present invention. The magnetic head includes a shield case 101 enclosing therein a magnetic head core, output lead-out terminals 102 connected to the output coil within the shield case 101, a holder member 103 for mounting a compensating coil 105 on the shield case 101, a spool 104 for winding thereon the compensating coil 105 mounted on the holder member 103, a printed substrate 106 attached to the spool 104 for connecting the compensating coil 105 to the output lead out terminals 102, lead-out terminals 107 for external output provided on the printed substrate 106, a magnetic head mounting member 108 attached to the bottom surface of the shield case 101, tape guides 109 attached to the side walls of the shield case 101 for controlling the running movement of magnetic tape, screws 110 for securing the tape guides 109 to the shield case 101, and a tape sliding surface 111 of the magnetic head.

In FIG. 5, the compensating coil 105 is wound on the flattened spool 104 and connected in series with the internal coil in the head through the printed substrate 106 so as to offset the noise, as shown in FIG. 4(a). In the present embodiment, the number of turns of the internal coil is 1200 while the number of turns of the compensating coil is 10, resulting in the best characteristics against induced noise.

Figure 7:
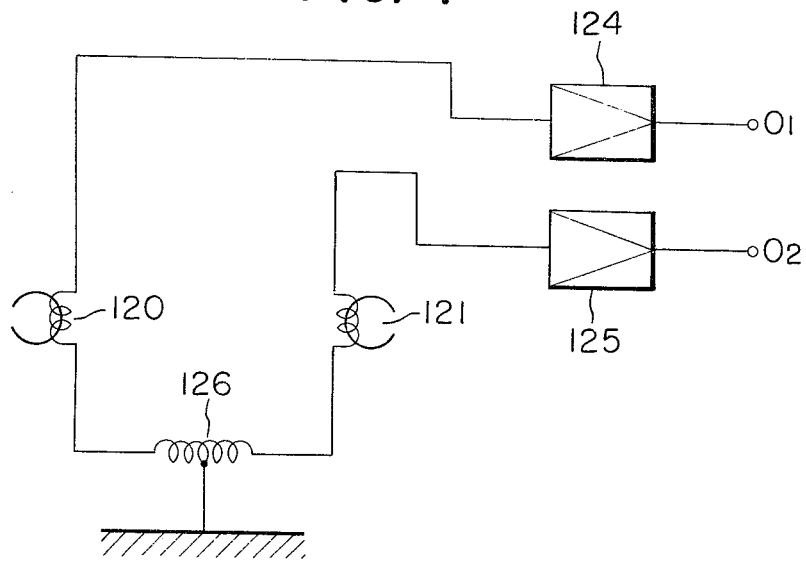

FIG. 6 illustrates the manner in which the compensating coils and the magnetic head core windings are connected together when the present invention is applied to a two-channel stereo head. In the figure, there are seen internal core windings 120 and 121 within the shield case, compensating coils 122 and 123 connected to the internal core windings 120 and 121, respectively, and amplifiers 124 and 125 for amplifying the outputs produced in the internal core windings 120 and 121 and for putting out such outputs at output terminals $O_1$ and $O_2$. In this case, if the compensating coil spool 104 similar to that already described and shown in FIG. 5 is employed as the means for mounting the compensating coil on the shield case of the magnetic head, two coils identical in direction and number of turns will have to be wound on a common spool, but if one side of the reproduce coils is grounded at a common point as in the case of the stereo reproduce head, the compensating coils may from first be formed as a single compensating coil having a common grounding mid-point tap and thus, in fact, the compensating coils 122 and 123 shown in FIG. 6 may be replaced by a single compensating coil 126 common to two internal core windings 120 and 121 and having a center tap at the center thereof, as shown in FIG. 7. Thus, only three terminals will be required and this will mean an advantage in cost.

Figure 8:
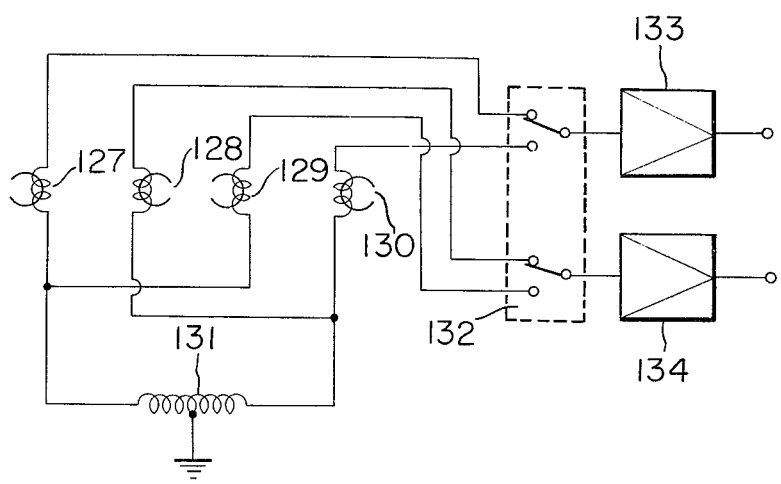
Figure 9:
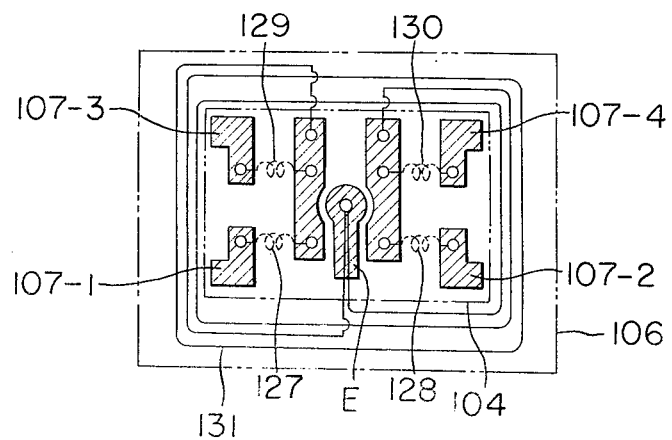
FIG. 9 shows a printed substrate circuit for concretely illustrating the connection between the compensating coil mounted on the magnetic head of FIG. 5 and the magnetic head core coils.

FIG. 8 is a circuit diagram showing the centertapped compensating coil of FIG. 7 as applied to the four-channel stereo head for cassette auto-reverse shown in FIG. 5. The circuit includes left-handed and right-handed core windings 127 and 128 for the running movement in normal direction, right-handed and left-handed core windings 129 and 130 for the running movement in reverse direction, a compensating coil 131 having a common earthing mid-point tap and commonly connected one end of each of the four core windings 127, 128, 129, 130, a changeover switch 132 for changing over the outputs in the normal and the reverse direction, and amplifiers 133 and 134. FIG. 9 is a diagram of a specific wiring whereby the connection system between the compensating coil 131 and the internal core windings 127–130 shown in FIG. 8 is realized on the printed substrate 106 already described with respect to FIG. 5. Denoted by 107-1, 107-2, 107-3 and 107-4 are external output terminals, and the other reference numerals are similar in significance to those already described with respect to FIG. 8.

Incidentally, the invention hitherto described is highly effective in that it eliminates the noise voltage induced by the external magnetic field in the vertical direction, whereas it is disadvantageous in that it cannot eliminate the noise voltage induced by the external magnetic field in the horizontal direction. It is, in fact, the case with conventional magnetic heads that the influence of the noise induced by the horizontal external magnetic field is much lower than that of the noise induced by the vertical external magnetic field and thus, in the designing of a magnetic head, the influence of the latter noise must only be taken into consideration and in this context, the above-described invention is still useful, but in some cases the noise induced by the horizontal external field is not negligible depending on the shape and environment of the magnetic head.

In view of this, the present invention further intends to provide a magnetic head in which the noise voltage resulting from the horizontal and the vertical external field may be eliminated. Before the construction of such a magnetic head is described, the relation between the external field and the noise voltages resulting therefrom will be analysed further.

Figure 10:
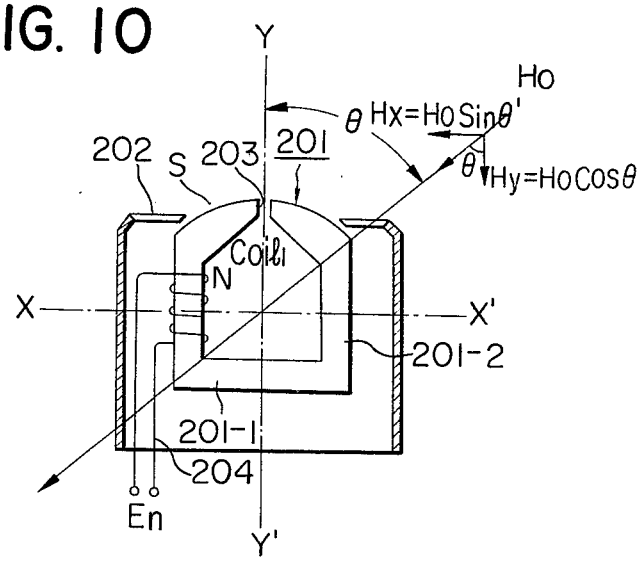
FIG. 10 is a cross-sectional side view of the common magnetic head according to the prior art.

FIG. 10 is a cross-sectional view of a conventional and common magnetic head as seen from one side thereof. The magnetic head includes a magnetic head core 201 comprising a pair of left and right core halves 201-1 and 201-2 abutting with each other, a shield case 202 enclosing therein the magnetic head core 201 except for the tape sliding surface thereof, a gap portion 203 of the magnetic head core 201, and a reproduce coil 204 wound on the magnetic head core 201 with a number of turns N, as shown. Now, as illustrated, a coordinate system X-Y is assumed with Y-Y' axis being parallel to the core 201-1 on which the reproduce coil 204 is wound and with X-X' axis being orthogonal to the Y-Y' axis.

Consideration will now be given to an induced voltage En produced in the coil 204 when a magnetic field of intensity Ho is applied to the magnetic shield case from outside thereof at an angle $\theta$ with respect to the Y-Y' axis.

In FIG. 10, when a unit field is applied to the reproduce coil 204 wound on the core half 201-1, in X- and Y-direction, let the voltages induced in a unit winding of the reproduce coil 204 be Kx (efficiency of reproduction in x-direction) and Ky (efficiency of reproduction in y-direction), respectively. Since the field Ho is a vectorial quantity and its X-direction and Y-direction components are Ho Sin $\theta$ and Ho Cos $\theta$, the voltages Enx and Eny induced in the reproduce coil 204 by the X- and the Y-direction field component may be expressed as follows:

$$Enx = N \cdot Kx \, Ho \, Sin \, \theta \qquad (1)$$

$$Eny = N \cdot Ky \, Ho \, Cos \, \theta \qquad (1)$$

The total induced voltage En is:

$$En = Enx + Eny = NHo(Kx \, Sin \, \theta + Ky \, Cos \, \theta)$$
$$= NHo \sqrt{Kx^2 + Ky^2} \, sin(0 + \alpha) \qquad (2)$$
$$\alpha = Tan^{-1} Ky/Kx$$

Figure 11A:
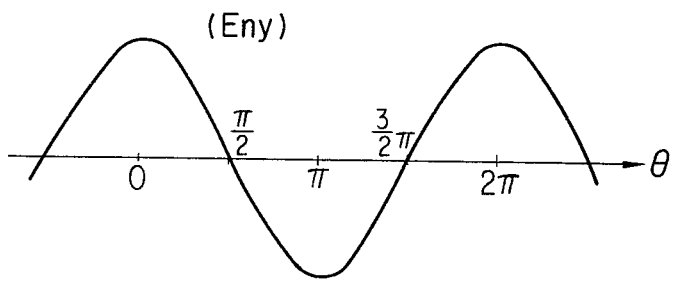
FIGS. 11(a), (b) and (c) are graphs illustrating the induced voltages induced in the reproduce coils by the horizontal and the vertical component of an external magnetic field when applied to the magnetic head of FIG. 10, and the combined induced voltage.
Figure 11B:
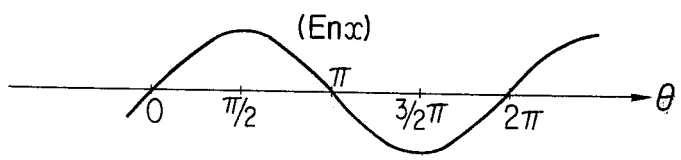
Figure 11C:
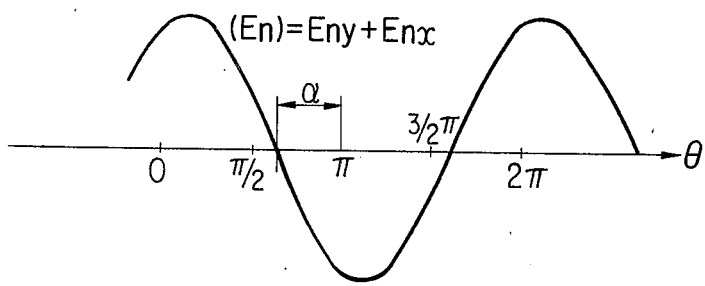

When graphically represented, Enx, Eny and En will be such as shown in FIGS. 11(a), (b) and (c).

Figure 1A:
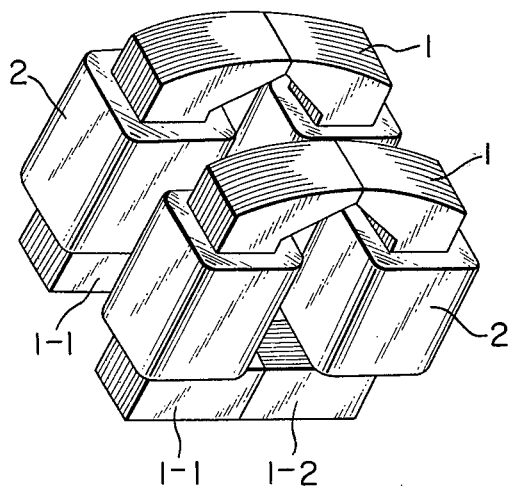
FIGS. 1(a) and (b) are perspective views of the two-track magnetic head cores according to the prior art.
Figure 1B:
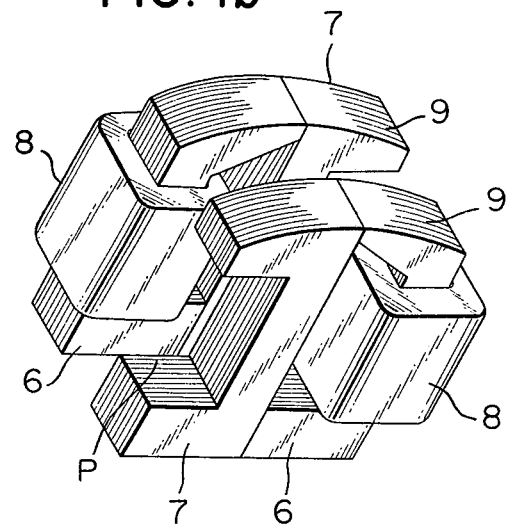
Figure 2A:
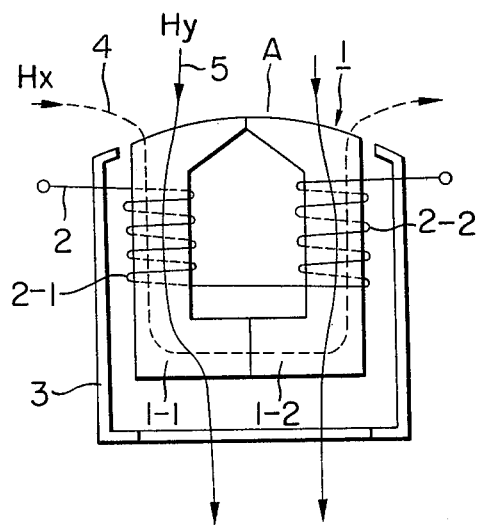
FIG. 2(a) illustrates the relationship between the external magnetic field and the reproduce coil when the magnetic head core of FIG. 1(a) is enclosed in a shield case.
Figure 2B:
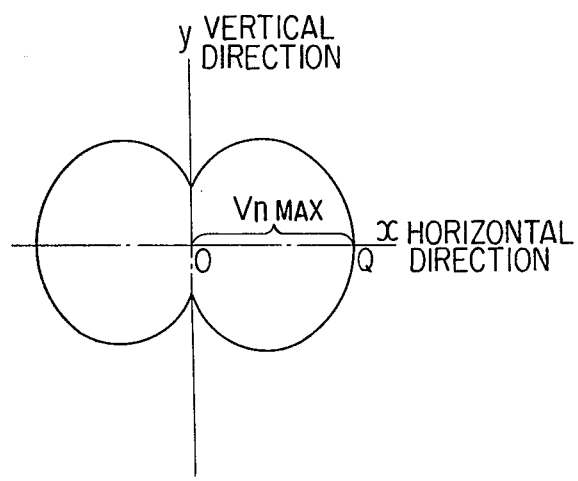
FIG. 2(b) is a graph of characteristic curve showing the magnitude of the induced noise voltage in the magnetic head of FIG. 2(a) with respect to the directions of the external magnetic field.

Analysis will now be made of the induced voltages in the balance-coiled magnetic head as shown in FIGS. 1(a) and 2(a) wherein coils are wound on the two opposed core halves 201-1 and 201-2 of FIG. 10 and connected so that the induced voltages in these coils negate each other with respect to the Y-direction field.

Figure 12A:
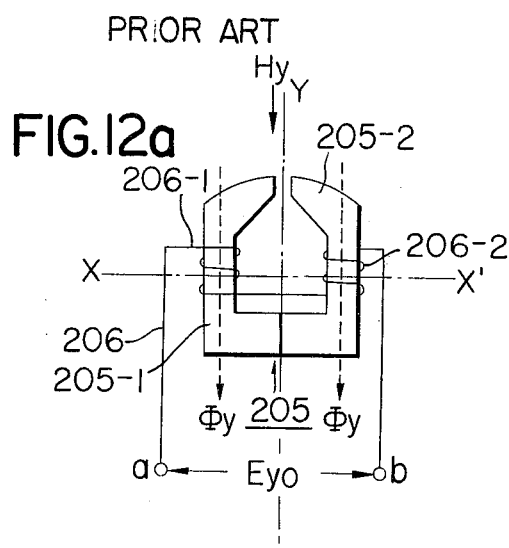
FIGS. 12(a) and (b) illustrate, in a balance-coiled magnetic head, the manner in which magnetic fluxes are caused to pass through the coils of such magnetic head by the vertical and the horizontal component of the external magnetic field.

FIGS. 12(a) and (b) illustrate the conditions of the magnetic fluxes passing through the coil due to the Y- and X-direction fluid components of the balance-coiled magnetic head. Designated by 206-1 is a coil wound on a core half 205-1 forming a magnetic head core 205, and 206-2 a coil wound on a core half 205-2 opposed to the core half 205-1. These coils are connected in series to form an output winding 206 so that the induced voltages produced therein negate each other with respect to the Y-direction field.

When the Y-direction field component Hy is applied to the magnetic core 205 as shown in FIG. 12(a), the noise voltage Eyo induced between the two terminals a and b of the output winding 206 will be as follows:

$$Eyo = Ey_1 + Ey_2 \qquad (3),$$

where $Ey_1$ is the y-direction induced voltage produced in the coil 206-1 and $Ey_2$ is the y-direction induced voltage produced in the coil 206-2. Equation (3) may be rewritten by the use of equation (1)', as follows:

$$Eyo = Ho \, (Ky_1 N_1 \, Cos \, \theta - Ky_2 N_2 \, Cos \, \theta) \qquad (4),$$

where $Ky_1$ and $Ky_2$ are the efficiencies of production in the coils 206-1, and 206-2, and $N_1$ and $N_2$ are the number of turns of these coils, respectively.

Figure 12B:
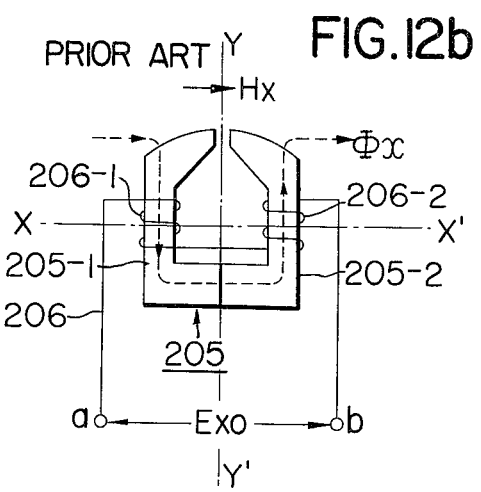

Likewise, in FIG. 12(b), the induced noise voltage Exo produced between the terminals a and b when the X-direction field component Hx is applied as indicated by broken line will be:

$$Exo = Ex_1 + Ex_2.$$

where $Ex_1$ is the x-direction induced voltage produced in the coil 206-1 and $Ex_2$ is the x-direction induced voltage produced in the coil 206-2.

Hence, $$Exo = Ho \, (Kx_1 \, N_1 \, Sin \, \theta + Kx_2 \, N_2 \, Sin \, \theta) \qquad (5).$$

where $Kx_1$ is the efficiency of production in x-direction of the coil 206-1 and $Kx_2$ is the efficiency of production in x-direction of the coil 206-2.

$$\text{If } N_1 = N_2 = \tfrac{1}{2} N \text{ and } Ky_1 = Ky_2 \qquad (6),$$

$$Eyo = 0$$

$$Exo = N \, Ho \, Kx \, Sin \, \theta \qquad (7)$$

Thus, in the balance-coiled magnetic head, the total induced voltage Exyo when the external field Ho is applied at the angle $\theta$ with respect to the Y-axis will be obtained:

$$Exyo = Exo + Eyo = Exo \qquad (8)$$

Figure 13A:
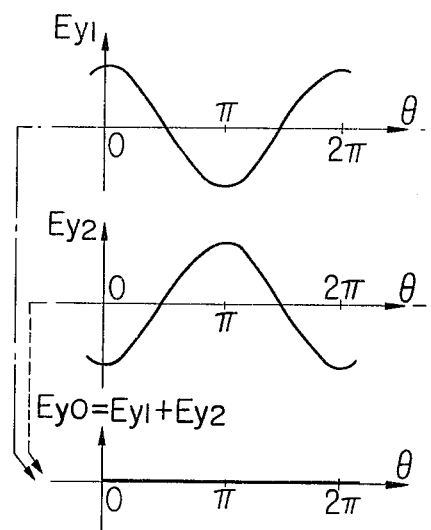
FIGS. 13(a), (b), (c) and (d) show waveforms of the induced voltages produced in the coils of the balance-coiled magnetic head of FIG. 12 by the external magnetic field.

FIG. 13(a) graphically illustrates $Ey_1$, $Ey_2$ and Eyo under the conditions of equation (6).

Figure 13C:
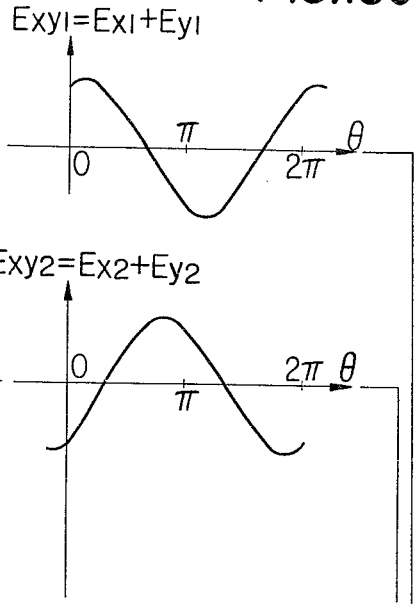
Figure 13B:
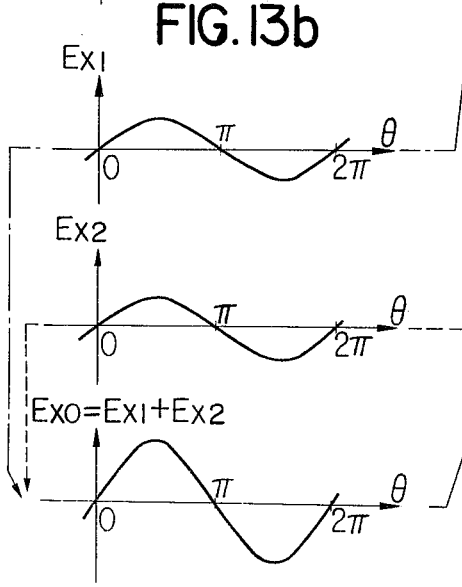

FIG. 13(b) graphically illustrates $Ex_1$, $Ex_2$ and Exo under the condition of equation (6).

FIG. 13(c) graphically illustrates the total induced noise voltage $Exy_1$ in the coil 206-1 obtained by combining the curves of $Ex_1$ and $Ey_1$ and the total induced noise voltage $Exy_2$ in the coil 206-2 obtained by combining the curves of $Ex_2$ and $Ey_2$.

Figure 13D:
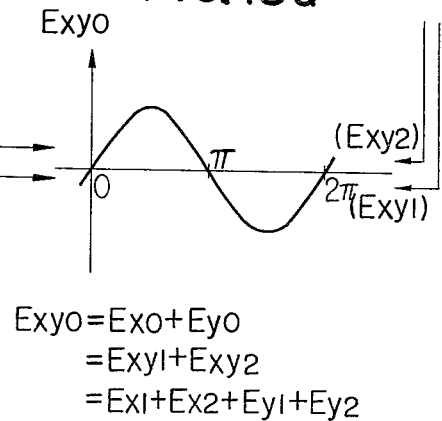

FIG. 13(d) is a graphical illustration of Exyo obtained from equation (8).

It will thus be understood that the balance-coiled magnetic head regarded as the most effective for the external field can completely negate the noise voltage resulting from the Hy field but is entirely ineffective for the Hx field.

Thus, in the balance-coiled magnetic head, the X-direction induced noise voltage production efficiency Kx must be reduced to decrease the induced noise voltage Exyo and this has heretofore been done as by reducing the dimensions of the opening in the shield case or the exposed dimensions of the magnetic core in the tape sliding surface thereof.

Nevertheless, such countermeasures have on the other hand suffered from drawbacks in that the shape effect is emphasized during reproduction or the undulation of the reproducing frequency characteristics is liable to take place in the long wavelength range. Especially, in the magnetic heads for use with cassettes wherein the tape speed is low, not only the elimination of such drawbacks cannot be expected but also Kx tends to be aggravated with the requirement for Hi-Fi, and in some of the Hi-Fi heads with a reduced shape effect, the production of the induced noise voltage is greater by about 10 dB than in ordinary heads, in spite of the Hi-Fi heads being of the balance-coiled type.

In view of this, the present invention further intends to provide a complete two-element balance-coiled head which is effective to sufficiently reduce the induced noise voltage not only for Hy but also for Hx.

Figure 14A:
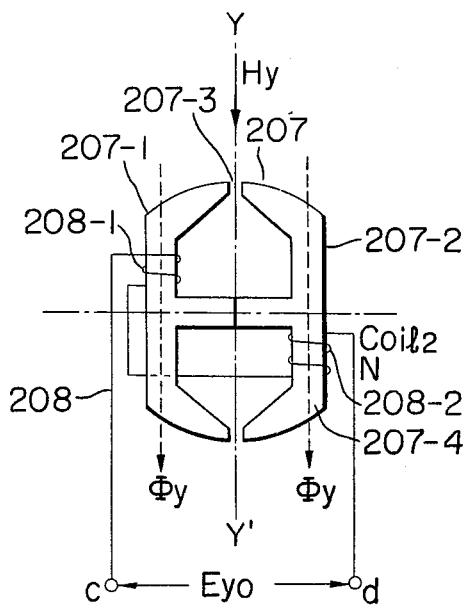
FIGS. 14(a) and (b) illustrate the principle of the magnetic head according to the present invention.

FIGS. 14(a) and (b) illustrate the principle of the magnetic head according to the present invention which can remove the noise voltage resulting from the external field both in the horizontal and the vertical direction. In the figures, there is seen a magnetic head core 207 comprising a combination of a substantially T-shaped left core half 207-1 formed of a highly permeable material and a similarly shaped right core half 207-2 formed of similar material, the two cores 207-1 and 207-2 abutting with each other in vertically and horizontally symmetrical relationship about X-Y axes to define a magnetic gap 207-3, a first coil 208-1 wound on the left core half 207-1 above the X-axis, and a second coil 208-2 wound on a projected portion 207-4 of the right core half 207-2 extending downwardly below the X-axis and in the direction away from the magnetic gap 207-3. The first 208-1 and the second coil 208-2 are connected in series to form an output winding 208 so that the induced voltages resulting from the vertical field Hy as shown may negate each other between the first and second coils 208-1 and 208-2.

Reference will now be had to FIG. 14(a) to describe the operation of the shown magnetic head when the external vertical field Hy is applied thereto. Magnetic fluxes passing through the first coil 208-1 and the second coil 208-2, as indicated by broken lines, upon application of the vertical field Hy, are both Φy and therefore, if these two coils are equal in number of turns, the induced voltages produced in the two coils may completely negate each other with a result that the voltage Eyo produced between the coil terminals c and d becomes zero.

Figure 14B:
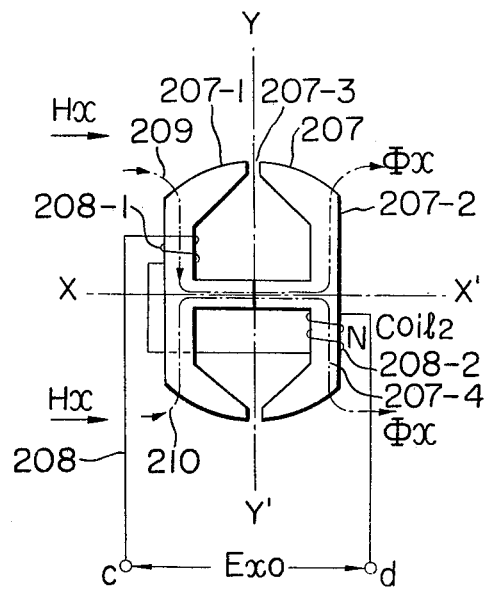

Reference will also be had to FIG. 14(b) to describe the operation of the magnetic head when an external horizontal field Hx is applied thereto. When the horizontal field Hx enters the magnetic core 207 as indicated by arrow, there are created two magnetic paths as indicated by chain lines 209 and 210, because the configuration of the magnetic core 207 is horizontally and vertically symmetric about X-Y axes.

More specifically, the horizontal field applied to above the X-axis produces a magnetic flux Ex passing through the first coil 208-1 as indicated by chain line 209 and the horizontal field applied to below the X-axis produces a magnetic flux Φx passing through the right core half 207-1 and the second coil 208-2 wound on the projected portion 207-4, as indicated by chain line 210. Since the chain lines 209 and 210 pass through the first 208-1 and the second coil 208-2 in the same direction, the induced voltages in the two coils are equal and therefore, the voltage Exo produced between the terminals c and d of the two coils becomes zero.

According to the construction of the magnetic head described above and shown in FIG. 14, the induced noise voltage resulting both from the vertical field Hy and the horizontal field Hx may be sufficiently negated by each other and especially, if the magnetic head construction of FIG. 14 is made completely point-symmetrical about the origin of the X-Y axes (in the core 207 of FIG. 14, such origin is the junction between the core halves 207-1 and 207-2), complete mutual negation may be attained both for Hy and Hx and this will promise a magnetic head in which induced noise voltage is zero for the field in any direction.

When the balance-coiled head of FIG. 12 is so viewed the two coils wound on the core halves forming the head are symmetrical only about the Y-axis and thus, that head may be explained as being capable of negating only one of Hy and Hx because of the direction of connection between the two coils.

On the other hand, a practical magnetic head construction requires the coil lead-out terminals to be provided on the opposite side from the tape sliding surface and also, in the magnetic head as shown in FIG. 14, the compensating coil 208-2 (second coil) taking no part in the operation and having the same inductance as the operating coil 208-1 (first coil) used for the record-reproduce operation of the magnetic head is connected in series with the operating coil 208-1, and this means a low efficiency of the magnetic head. In addition, the requirement in the practical magnetic head construction that the coil lead-out terminals be provided on the opposite side from the tape sliding surface leads to difficulties in manufacturing.

Figure 15:
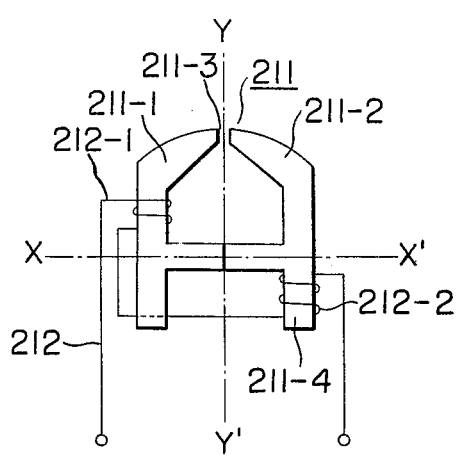
FIGS. 15 and 16 illustrate further embodiments of the magnetic head according to the present invention.
Figure 16:
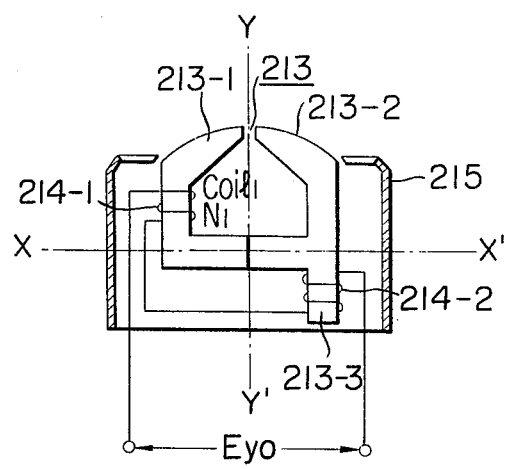

Such difficulties may be overcome by embodiments as shown in FIGS. 15 and 16. In both of these embodiments, like the principle of the present invention described in connection with FIG. 14, an operating coil and a compensating coil are provided at locations symmetrical with both of the Y and X axes and the compensating coil is not included in the operating closed magnetic circuit.

In FIG. 15, a magnetic head core 211 comprises a pair of core halves 211-1 and 211-2 horizontally symmetrical about Y-axis and abutting with each other to substantially form an H-shape except for the tape sliding surface, with a magnetic gap 211-3 defined therebetween. At locations symmetrical with both the X- and the Y-axes of the magnetic head core, an operating coil 212-1 and a compensating coil 212-2 are wound and connected together so as to form an output winding 212. More specifically, the compensating coil 212-2 is wound on the projected portion 211-4 of the core half 211-2 extending in the direction away from the magnetic gap 211-3.

The magnetic head shown in FIG. 16 includes a magnetic head core 213 comprising an ordinary core half 213-1 similar to the core half 205-1 forming the balance-coiled head shown in FIG. 12 and a core half 213-2 having a projection 213-3 for winding thereon a compensating coil at the opposite side from the tape sliding surface, the two core halves abutting with each other, an operating coil 214-1 wound on the core half 213-1 of the magnetic head 213, and a compensating coil 214-2 wound on said projection 213-3 and connected in series with the coil 214-1, the compensating coil 214-2 being such that induced voltages of opposite senses are produced for magnetic fluxes of the same direction.

In the magnetic head of FIG. 15, which adopts the described construction, the magnetic circuit on the compensating coil 212-2 side is open as shown, to thereby enable the inductance to be greatly decreased and further, by suitably selecting the ratio of number of turns of the operating coil 212-1 to the compensating coil 212-2 and by suitably selecting the magnetic core dimensions on which the compensating coil 212-1 is wound, there may be provided a magnetic head having a characteristic against induced noise voltage very similar to the characteristics of the completely symmetrical construction as shown in FIG. 14.

Also, the compensating coil 212-2, which is situated outside the operating closed magnetic circuit, is effective to negate its induced noise voltages without adversely affecting the record-reproduce operation of the operating coil 212-1.

Particularly, the construction of FIG. 16 is advantageous in that the number of turns of the compensating coil 214-2 may be approximately half that of the operating coil 214-1 since, with respect to the vertical field Hy, most of the magnetic flux collected by the pair of left and right core halves passes through the compensating coil 214-2 as shown. On the other hand, with respect to the horizontal field Hx, most of the magnetic flux passing through the operating coil 214-1 from the tape sliding surface side of the core again goes through toward the opposed tape sliding surface side of the core, but part of such magnetic flux passes through the compensating coil 214-2 and outwardly of the opposite said of the core from said sliding surface while, at the same time, the horizontal field entering from the outside of the shield case opposite from the sliding surface produces a magnetic flux passing through the compensating coil 214-2. By these magnetic fluxes, there are produced magnetic fluxes passing through the operating coil 214-1 and the compensating coil 214-2. By these magnetic fluxes, induced voltages of the opposite polarities are produced in the operating and compensating coil 214-1 and 214-2 and negate each other, but in order to provide the best total induced noise voltage characteristic, it is necessary to determine the ratio of number of turns of the operating coil to the compensating coil while taking into account the optimum conditions of the number of turns with respect totthe Y-direction field in accordance with construction and shape of the magnetic core and of the shield case 215.

Figure 17:
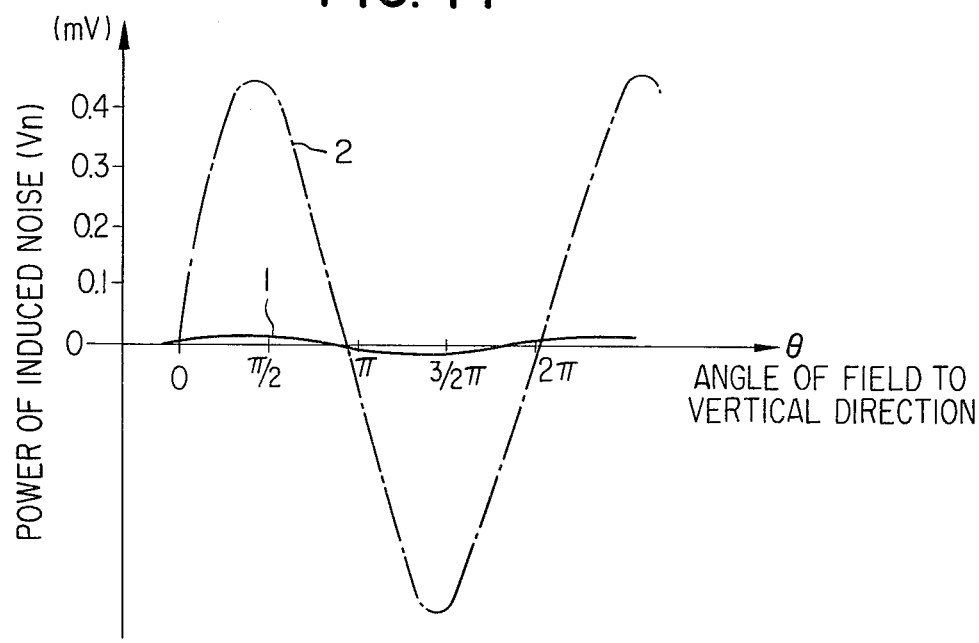
FIG. 17 is a graph of characteristic curve illustrating the relationship between the directions of the external magnetic field and the induced noise output of the magnetic head according to the present invention.

FIG. 17 is a graph illustrating the characteristics of the induced noise voltages as measured in a cassette stereo magnetic head constructed as shown in FIG. 16, with the number of turns selected to $N_1=600$ for the operating coil 214-1 and to $N_2=272$ for the compensating coil 214-2, and in a conventional balance-coiled head as shown in FIG. 12 with the number of turns selected to $N=300\times2$, while placing each of these magnetic heads in an equal field of $Ho=430$ AT/m 90 Hz and varying the direction $\theta$ of Ho (angle of the field with the vertical direction). In the graph, the solid-line curve (1) represents the output of the inventive magnetic head and the dot-and-dash line curve (2) represents the output of the conventional balance-coiled head. As will be seen from this graph, the noise characteristic of the inventive magnetic head is much better than that of the conventional magnetic head.

Figure 18:
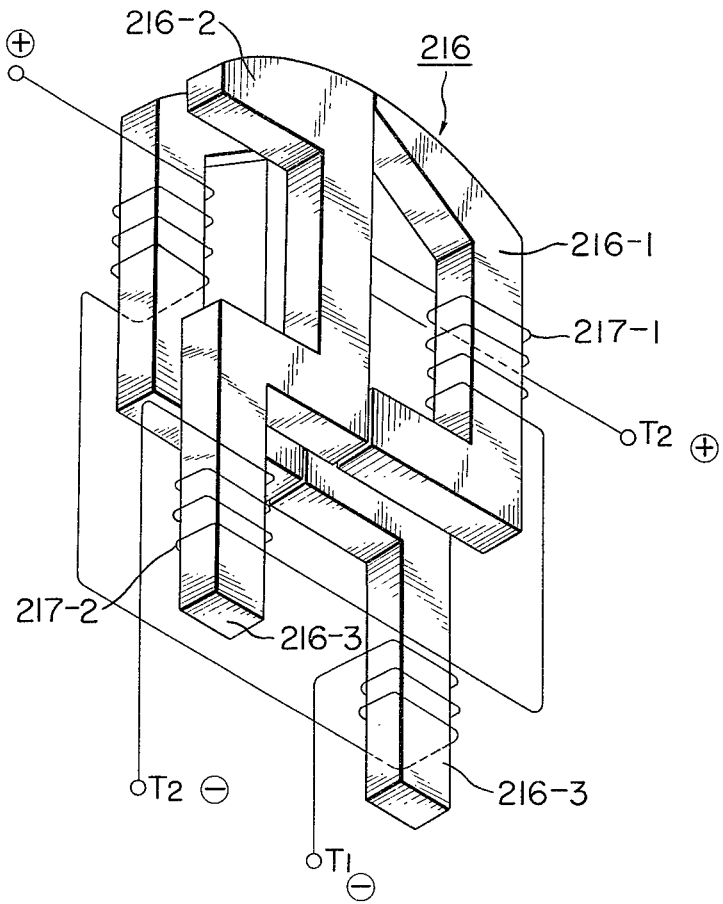
FIGS. 18 and 19 are schematic perspective views showing practical forms of the magnetic head according to the present invention.

FIG. 18 is a perspective view showing a specific example in which a plurality of magnetic head cores as shown in FIG. 16 are assembled together. As will be seen from this figure, a core half 216-1 forming part of magnetic head core 216 has an operating coil 217-1 wound thereon and another core half 216-2 is arranged in opposed relationship with the core half 216-1 to form the head core 216 with the core half 216-1. The core half 216-2 has a projection 216-3 for compensating coil corresponding to the projection of the core half 7 shown in FIG. 1(b) which is situated on the opposite side from the tape sliding surface. A compensating coil 217-2 is wound on the projection 216-3 so as to be opposite in phase with the magnetic fluxes of the same direction, and is connected in series with the operating coil 217-1. The projection 216-3 having wound thereon the compensating coil 217-2 does not overlap the corresponding portion of the adjacent core, whereby a multichannel head, if desired, may be formed as a compact and high-density multichannel head without any drawback involved.

Figure 19:
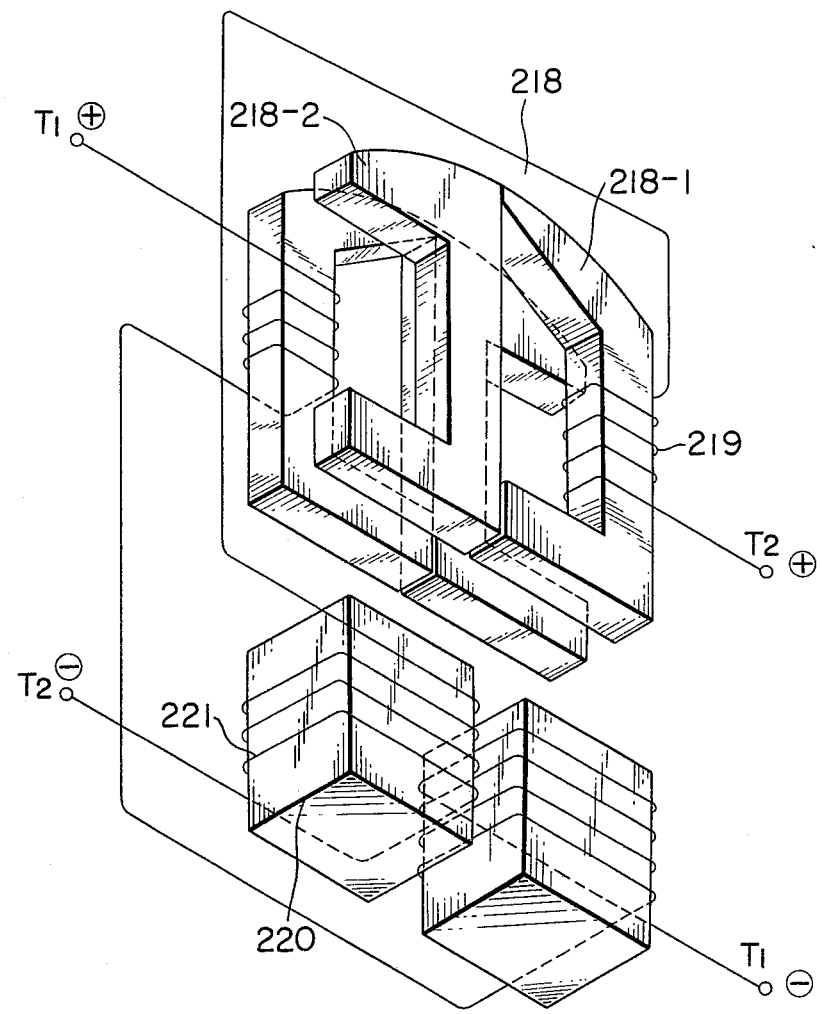

FIG. 19 is a schematic perspective view showing a modified form of the magnetic head according to the present invention. A magnetic head core 218 is similar in construction to the magnetic head core 9 shown in FIG. 1(b), and comprising a core half 218-1 having wound thereon an operating coil 219 and a corresponding core half 218-2. A hollow bobbin 220 has a compensating coil 221 wound on the surface thereof and connected in series with the operating coil 219, the compensating coil 221 being would so that the induced voltage reproduced for the magnetic fluxes of the same direction may mutually negate the induced voltage produced in the operating coil 219. The bobbin 220 is situated at the opposite side from the tape sliding surface of the magnetic head 218 and arranged so as to capture the magnetic flux as it passes through the magnetic head core 218.

It can be understood that the noise voltages may also be sufficiently negated by the magnetic head of such construction, and the reduced efficiency of flux convergence caused by the nonshort-circuited relation between the magnetic head core 218 and the bobbin 220 extending through the compensating coil 221 may be compensated for by increasing the cross-sectional area of the compensating coil 221 to such an extent as to cover both core halves of the adjacent channel, as shown.

While the present invention has generally been described, the purview of the invention lies in a magnetic head having a magnetic core comprising a pair of left and right highly permeable materials opposed to each other with a magnetic gap therebetween to form a closed magnetic circuit, a first coil wound on one of the pair of opposed highly permeable materials, and a second coil having one end connected in series with the first coil and arranged on the other highly permeable material and outside the closed magnetic circuit at the opposite side from the magnetic gap so that the induced voltage produced in the second coil is opposite in polarity to that produced in the first coil. Thus, the magnetic head of the present invention is very simple in construction and yet presents an excellent induced noise voltage characteristic which is highly useful in practice.

What is claimed is:

1. A miniaturized magnetic head comprising:
   a first core half;
   an output winding having a finite number of turns wound around said first core half;
   a second core half mated with said first core half to form a magnetic gap therebetween;
   a shield case substantially enclosing at least said first and second core halves and said output winding; and
   a compensating coil, disposed outside of said shield case and having one end connected to one end of said output winding, said compensating coil being spaced adjacent to said shield case so that said compensating coil captures the external noise fluxes which pass outwardly through said shield case and through at least said first core half, and having a fewer number of turns than said output winding such that the total induced voltage in said compensating coil substantially neutralizes the induced voltage from the external magnetic flux passing through said output winding;
   whereby the reduced size of the compensating coil resulting from the utilization of the magnetic flux passing through said shield case and said first core half reduces the overall size of the magnetic head.

2. A miniaturized magnetic head according to claim 1, wherein said compensating coil captures the external noise fluxes which pass outwardly through both of said core halves.

3. A miniaturized magnetic head comprising:
   a first core half;
   a first output winding having a finite number of turns wound around said first core half;
   a second core half mated with said first core half to form a first magnetic gap therebetween, said second core half having a first recess;
   a third core half adjacent to said second core half;
   a second output winding having a finite number of turns wound around said third core half and extending into said first recess;
   a fourth core half mated with said third core half to form a second magnetic gap therebetween, said fourth core half being adjacent said first core half and having a second recess for accommodating said first output winding;
   a shield case substantially enclosing at least said first, second, third and fourth core halves and said first and second output windings; and
   first and second compensating coils, disposed outside of said shield case, each having one end connected to one end of said first and second output windings, said compensating coils being spaced adjacent to said shield case so that said compensating coils capture the external noise fluxes which pass outwardly through said shield case and through at least said first and third core halves, and having a fewer number of turns than said first and second output windings such that the total induced voltage in said compensating coils substantially neutralizes the induced voltage from the external magnetic fluxes passing through said first and second output windings;
   whereby the reduced size of the compensating coils resulting from the utilization of the magnetic fluxes passing through said shield case and said first and third core halves reduces the overall size of the magnetic head.

4. A magnetic head according to claim 3, wherein said first compensating coil captures the external noise fluxes which pass through said first and second core halves, and said second compensating coil captures the external noise fluxes which pass through said third and fourth core halves.

5. A magnetic head according to claim 4, wherein each of said second and fourth core halves is substantially C-shaped and wherein the recess in each of said second and fourth core halves is oriented outwardly.

6. A magnetic head according to claim 3, wherein each of said second and fourth core halves is substantially C-shaped and wherein the recess in each of said second and fourth core halves is oriented outwardly.

* * * * *